(12) United States Patent
Trappeniers et al.

(10) Patent No.: US 9,571,474 B2
(45) Date of Patent: Feb. 14, 2017

(54) METHOD FOR PROVIDING A SERVICE BASED ON TAG INFORMATION, AND CORRESPONDING TAG AND TAG READING DEVICE

(75) Inventors: Lieven Trappeniers, Herentals (BE); Zhe Lou, Antwerp (BE); Sigurd Van Broeck, Zoersel (BE); Marc Bruno Frieda Godon, Londerzeel (BE); Johan Georges Prosper Criel, Ghent (BE)

(73) Assignee: Alcatel Lucent, Boulogne-Billancourt (FR)

( * ) Notice: Subject to any disclaimer, the term of this patent is extended or adjusted under 35 U.S.C. 154(b) by 489 days.

(21) Appl. No.: 12/473,057

(22) Filed: May 27, 2009

(65) Prior Publication Data

US 2009/0303019 A1    Dec. 10, 2009

(30) Foreign Application Priority Data

Jun. 4, 2008    (EP) ..................... 08290513

(51) Int. Cl.
| | | |
|---|---|---|
| *G06K 7/00* | (2006.01) | |
| *H04L 29/06* | (2006.01) | |
| *G06F 21/34* | (2013.01) | |
| *G06Q 30/02* | (2012.01) | |

(52) U.S. Cl.
CPC ........... *H04L 63/0492* (2013.01); *G06F 21/34* (2013.01); *G06Q 30/02* (2013.01); *H04L 63/123* (2013.01)

(58) Field of Classification Search
CPC ..... G06F 21/34; G06Q 30/02; H04L 63/0492; H04L 63/123
USPC .................................... 340/10.1, 10.3, 10.41
See application file for complete search history.

(56) References Cited

U.S. PATENT DOCUMENTS

| | | | | |
|---|---|---|---|---|
| 5,499,017 | A | * | 3/1996 | Beigel ..................... 340/572.1 |
| 8,386,794 | B2 | * | 2/2013 | Kang et al. ................. 713/181 |
| 2002/0116268 | A1 | | 8/2002 | Fukuda |
| 2003/0006878 | A1 | * | 1/2003 | Chung ...................... 340/5.25 |
| 2004/0049316 | A1 | * | 3/2004 | Pintsov et al. .............. 700/226 |
| 2005/0044180 | A1 | * | 2/2005 | Lamers et al. .............. 709/218 |
| 2006/0055538 | A1 | * | 3/2006 | Ritter ....................... 340/572.1 |

(Continued)

FOREIGN PATENT DOCUMENTS

| | | | |
|---|---|---|---|
| EP | 1 345 183 | A2 | 9/2003 |
| EP | 1 577 824 | A1 | 9/2005 |

(Continued)

OTHER PUBLICATIONS

European Search Report.

*Primary Examiner* — Benjamin C Lee
*Assistant Examiner* — Rajsheed Black-Childress
(74) *Attorney, Agent, or Firm* — Fay Sharpe, LLP

(57) ABSTRACT

A method for providing a service by a server to a reader device is disclosed, the provision being based on the readout information of a readout operation by the reader device of a tag, the tag comprising information relating to the unique tag-ID of the tag, comprising
- reading out the unique tag-ID during the readout operation;
- communicating the unique tag-ID to the server;
- providing the service to the reader device, the service being determined at least partially based on the value of the unique tag-ID.

Corresponding tags and tag reader devices have further also been disclosed.

15 Claims, 1 Drawing Sheet

(56) References Cited

U.S. PATENT DOCUMENTS

| | | | |
|---|---|---|---|
| 2006/0273920 A1* | 12/2006 | Doan et al. | 340/825.29 |
| 2006/0283945 A1* | 12/2006 | Excoffier et al. | 235/439 |
| 2006/0294388 A1* | 12/2006 | Abraham et al. | 713/182 |
| 2007/0214055 A1* | 9/2007 | Temko | 705/22 |
| 2008/0208753 A1* | 8/2008 | Lee et al. | 705/51 |
| 2009/0167499 A1* | 7/2009 | Koo et al. | 340/10.1 |

FOREIGN PATENT DOCUMENTS

| | | | |
|---|---|---|---|
| EP | 1 622 346 A1 | | 2/2006 |
| KR | WO2007066861 | * | 6/2007 |
| KR | 10-0785810 | | 12/2007 |
| WO | WO 00/62263 A1 | | 10/2000 |
| WO | WO 03/058551 A1 | | 7/2003 |
| WO | WO 2004/003801 A1 | | 1/2004 |
| WO | WO 2006/035315 A1 | | 4/2006 |

* cited by examiner

METHOD FOR PROVIDING A SERVICE BASED ON TAG INFORMATION, AND CORRESPONDING TAG AND TAG READING DEVICE

TECHNICAL FIELD OF THE INVENTION

The present invention relates to the field of methods and devices for providing a service by a server to a reader device, the provision being based on the readout information of a readout operation by said reader device of a tag.

BACKGROUND OF THE INVENTION

Different RFID technologies have been defined today; Near Field Communication (NFC) technology and Electronic Product Code (EPC) technology are examples thereof, but many more exist.

Near Field Communication technology (NFC) originates from the NFC Forum; their specifications can be retrieved for instance at http://www.nfc-forum.org/home/specs. The technology has been and is further standardized in ISO/IEC.

Current NFC application launch is performed in the following manner (cfr. NFC standards):
  an NFC tag is read by an NFC reader (typically in a mobile phone)
  the content of the memory of the NFC tag is read.
  If the memory fields contain a properly formatted URI, the URI is called by the reader (the mobile phone).
  As such, the URI in the tag defines the service/application that should be started, both remotely as locally.

The above mentioned prior art comprises at least the following problems;
  1. when the application is launched, the server side does not know which specific tag (being read) caused the incoming request.
  2. The current security mechanism allows verifying the correctness of the content of the memory of a tag using the digital signature. However, the same valid content can still be replicated to another tag and there exist no means to check against this.

SUMMARY OF THE INVENTION

When terms as "first", "second", "third" and the like are used, this does not necessarily mean that a sequential or that a chronological order is to be assumed.

The term "comprising", should be interpreted as such that it does not exclude other elements or steps.

Referring to the prior art, there exists a need for adapting the service/application/content, the activation or provision of which triggered by an NFC tag, for a specific certified tag.

According to a first aspect of the present invention a method is disclosed for providing a service by a server to a reader device, the provision being based on the readout information of a readout operation by the reader device of a tag, the tag comprising information relating to the unique tag ID of the tag, comprising:
  reading out the unique tag ID during the readout operation;
  communicating the unique tag ID to the server;
  providing the service to the reader device, the service at least partially being determined based on the value of the unique tag ID.
Providing a service may comprise providing predetermined information to the reader device.

The reader device can be part of or can be a user device as for instance a mobile phone or PDA.

The readout operation of a tag by the reader can be performed according to any state of the art RFID technology, as for instance by means of NFC (near field communication) technology, as defined by the NFC forum, and further in ISO/IEC.

Other RF technologies can be used, but also non-RF technologies as optical or magnetic tag recognition may be used.

A tag typically comprises a unique tag ID, being an identification number or information identifying the tag uniquely. The communication of the unique tag ID by the reader to the server can be performed according to any state of the art technology. It may for instance be performed by sending the tag ID via the internet over any communication technology, as for instance GSM, GPRS, UMTS, Bluetooth, infrared technologies, etc.

The service is preferably at least partially determined by the value of the unique tag ID.

It may be determined completely by the value of the unique tag ID.

By providing the unique tag ID to the server and the server provider the server can identify from which tag the information is derived or for which tag service delivery is requested, and can therefore adapt its service to that specific tag.

The server can comprise a mapping list of tags and corresponding locations, or between tag IDs and other relevant parameters. In the case of association with locations, the server can be enabled to provide location specific services to the user.

According to embodiments of the present invention the method further comprises reading out service information from the tag and providing the service at least partially based on the service information.

Typically the service information comprises address information for the reader device or user device such that the user device or the user is directed to a predetermined information source. This information source can be a server as described before, which can thus be identified by said service information.

According to embodiments of the present invention the tag is being adapted for storing read only information and modifiable information, the read only information comprising information relating to the unique tag ID of the tag, and the method comprises reading out the unique tag ID from the read only information by said reader device.

According to embodiments of the present invention, the tag is being adapted for storing read only information and modifiable information, the modifiable information comprising information relating to the unique tag ID of the tag, and the method comprises reading out the unique tag ID from the modifiable information by the reader device.

The read only information is information which is stored on the tag but which cannot be changed. The modifiable information is information on the tag which can be changed or modified.

According to embodiments of the present invention the method further comprises comparing unique tag IDs on the read only information and modifiable information respectively. In theory, both unique tag IDs (can be called a first and a second unique tag ID) should be the same. Hacking activities may though replace the second unique tag ID in the modifiable information with another tag ID such that it does not correspond to the first tag ID. Therefore checking the first and the second unique tag IDs as to whether they are the same may provide an advantageous security check.

According to embodiments of the present invention, the method comprises reading out the service information from the modifiable information by the reader device.

According to embodiments of the present invention the service information comprises address information for retrieving said service or server.

According to embodiments of the present invention the method may further comprise digitally signing the modifiable information. It may thus comprise digitally signing the unique tag ID in the modifiable information or may comprise digitally signing the service information in the modifiable information or it may comprise digitally signing the unique tag ID and the service information together.

According to a second aspect of the present invention a device, for instance a tag, is disclosed comprising a means for storing information, the means being adapted for storing read only information and modifiable information, the read only information comprising information relating to the unique tag ID of the tag, wherein the modifiable information further comprises information relating to the unique tag ID of the tag.

According to embodiments of the present invention the modifiable information further comprises service information.

According to embodiments of the present invention the service information comprises at least a URI, an IP address or a telephone number.

According to preferred embodiments of the present invention the modifiable information is digitally signed. This means that the unique tag ID in the modifiable information can be digitally signed, or that the service information can be digitally signed, or that both service information and unique tag ID are digitally signed together.

According to a third aspect of the present invention a tag reading device is disclosed adapted for retrieving the unique tag ID and service information from the tag and for communicating the unique tag ID to a server corresponding with the service information.

Further aspects of the present invention are described by the dependent claims. The features from the dependent claims, features of any of the independent claims and any features of other dependent claims may be combined as considered appropriate to the person of ordinary skill, and not only in the particular combinations as defined by the claims.

BRIEF DESCRIPTION OF THE DRAWINGS

The accompanying drawings are used to illustrate embodiments of the present invention.

Figure 1A:
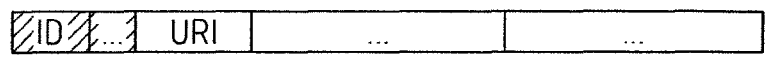
FIG. 1 illustrates memory structure for tags according to prior art embodiments (1A,1B) and embodiments according to the present invention (1C).

DESCRIPTION OF ILLUSTRATIVE
EMBODIMENTS

The above and other advantageous features and objects of the invention will become more apparent and the invention will be better understood from the following detailed description when read in conjunction with the respective drawings.

The description of aspects of the present invention is performed by means of particular embodiments and with reference to certain drawings but the invention is not limited thereto. Depicted figures are only schematic and should not be considered as limiting. E.g. certain elements or features may be shown out of proportion or out of scale with respect to other elements.

In the description of certain embodiments according to the present invention, various features are sometimes grouped together in a single embodiment, figure, or description thereof for the purpose of aiding in the understanding of one or more of the various inventive aspects. This is not to be interpreted as if all features of the group are necessarily present to solve a particular problem. Inventive aspects may lie in less than all features of such a group of features present in the description of a particular embodiment.

In order to illustrate aspects of the present invention, two scenarios are described below:

One could imagine several tags in several cities referring to same advertisements of a pop artist.

One could imagine several NFC tagged Teddy bears, each triggering a specific action (playing of a specific movie) when read by an NFC reader.

According to the state of the art the information provided, e.g. advertisements of the pop artist should be the same for all users or tag readers, or all tags would trigger the same specific action, for instance they would play the same specific movie, when being read by an NFC reader. This means that no differentiation of the service is possible for different tags.

There is clearly a requirement for adaptation of the service/application/content triggered by the NFC tag for a specific (certified) tag.

The state of the art solutions comprise at least the following shortcomings:

when the application is launched the server side does not know which specific tag (being read) caused the incoming request. Therefore service delivery to the end-user will be sub-optimal in the sense that no adaptation of the delivered service/application/content to the specific tag/place is possible.

the current security mechanism does allow to verify the correctness of the content of the memory of the tag by using a digital signature. However, the same valid content can still be replicated to another tag. The user has today no means to protect himself from this abuse.

Embodiments of the present invention introduce a new method for NFC application launch that solves the above mentioned problems or shortcomings. In certain aspects it is proposed to add the unique tag ID (the unique read only serial number that is embedded in the header of the NFC tag at production time) to the content of the tag.

Figure 1B:
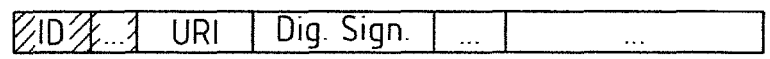
Figure 1C:
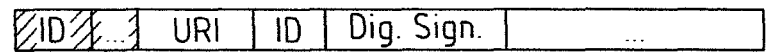

When a tag's content is read by the reader the URI and the tag ID can then be sent to the server to initiate the service/application. The combination URI plus tag ID can be certified as belonging to this particular tag by a digital signature. The memory structure of a NFC tag's memory is shown in FIG. 1. The shaded area on the left shows the read only fields whereas the white areas on the right show the memory banks of the tag. Prior art structures are shown in FIGS. 1A and 1B. It is proposed to add the unique tag ID to the tag's memory and, according to certain embodiments, to include it into the digital signature as shown in FIG. 1C.

Figure 2:
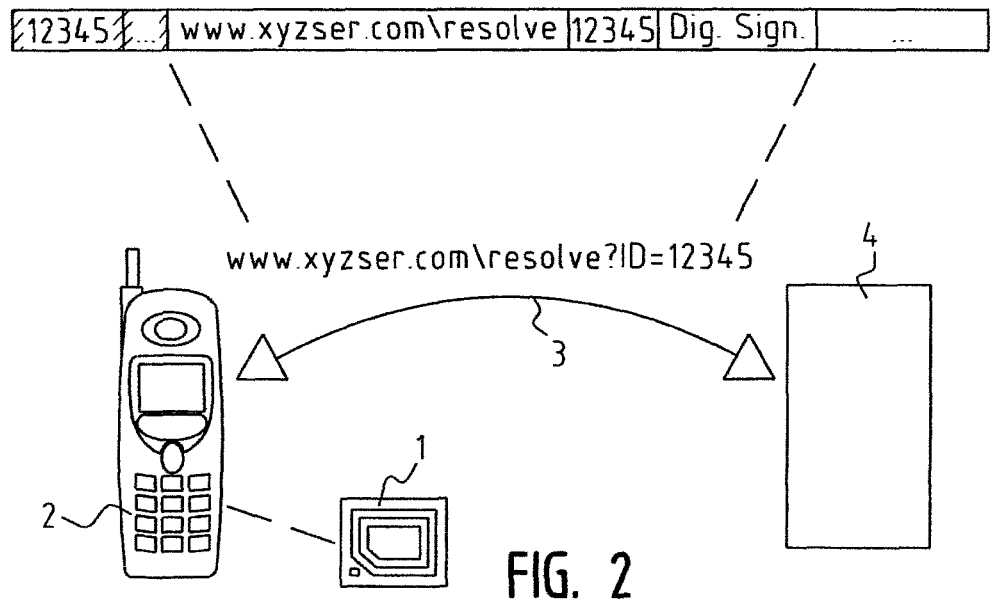
FIG. 2 illustrates an embodiment according to the present invention.

Additionally, it has been proposed to change the way an NFC reader deals with the content of an NFC tag (see FIG. 2). When an NFC tag is read (1), the reading device (2) can extract the URI, the tag ID and the digital signature. The user device (2) can use the digital signature to verify the integrity of the URI and the tag ID (3) and checks if the tag ID in the memory is the same as the read only tag ID (shaded area on the left of the memory structure). In a next step (3) the reading device assembles the URI and the tag ID (for example in the well known "URI? parameter=value" format) and sends it out.

An advantage of this solution is that the server side service/application function has a correct and certified knowledge of the ID of the NFC tag that triggered the incoming request. As such, referring to the examples of the pop artist advertisement or teddy bears, the server will know from which poster (from which place, which city) or from which teddy bear the request comes and can thus adapt the response accordingly. The service can thus be made tag specific. It can be made specific for predetermined sets or categories of RFID's.

According to another example, an alternative implementation can be considered. The adaptation of the service/application/content only works in a reliable way if the reader can verify the integrity of the content (e.g. check that it was not replicated on another tag). The combination of the digital signature and the inclusion of the tag ID is therefore required. An alternative implementation could be an implementation which does not need the addition of the tag ID to the memory banks of the tag. It would include the tag ID from the header, the read only information, to the content that is digitally signed.

Generally, any of the functions described herein can be implemented using software, firmware (e.g., fixed logic circuitry), hardware, manual processing, or a combination of these implementations. The terms "module, "component", "functionality" and "logic" as used herein generally represent software, firmware, hardware, or any combination thereof. In the case of a software implementation, the module, component, functionality, or logic represents program code that performs specified tasks when executed on processor(s) (e.g., any of microprocessors, controllers, and the like). The program code can be stored in one or more computer readable memory devices. Further, the methods and systems described herein are platform-independent such that the techniques may be implemented on a variety of commercial computing platforms having a variety of processors.

Methods in accordance with the present invention may also be described in the general context of computer executable instructions. Generally, computer executable instructions can include routines, programs, objects, components, data structures, procedures, modules, functions, and the like that perform particular functions or implement particular abstract data types. The methods described herein may also be practiced in a distributed computing environment where functions are performed by remote processing devices that are linked through a communications network. In a distributed computing environment, computer executable instructions may be located in both local and remote computer storage media, including memory storage devices.

While some embodiments described herein include some but not other features included in other embodiments, combinations of features of different embodiments are meant to be within the scope of the invention, and form different embodiments, as would be understood by the skilled person.

While the principles of the invention have been set out above in connection with specific embodiments, it is to be clearly understood that this description is merely made by way of example and not as a limitation of the scope of protection which is determined by the appended claims.

The invention claimed is:

1. A method for providing a service by a server to a reader device, the service being based on the readout information of a readout operation by said reader device of a tag, said tag is adapted to store read-only information and modifiable information, said read-only information comprising a first unique tag-ID of said tag, and said modifiable information comprising a second unique tag-ID of said tag and service information, said method comprising:
    reading out, by said reader device, said first unique tag-ID, said second unique tag-ID and said service information from said tag during said readout operation, wherein the first unique tag-ID comprises a read only serial number embedded in a header of the tag, and said service information comprises communication link information for contacting the server;
    comparing, by said reader device, the unique tag IDs of the read-only information and modifiable information and based on the said comparison said unique tag-ID and said service information are sent to said server;
    communicating, by said reader device and based on a match result of said comparing, said first unique tag-ID to said server using said service information;
    receiving said service at said reader device, said service being determined based on the read only serial number.

2. The method according to claim 1, further comprising digitally signing said modifiable information.

3. The method according to claim 1, wherein said service information comprises a telephone number.

4. A tag reading system comprising:
    a tag comprising read-only information having a first unique tag-ID, and modifiable information having a second unique tag-ID and service information;
    a tag reading device configured to retrieve the unique tag-IDs and service information from the tag and to communicate said first unique tag-ID to a server corresponding with and using said service information, said service information comprises communication link information for contacting the server, wherein the first unique tag-ID comprises a read-only serial number embedded in a header of the tag, and said tag reading device is configured to receive a service from the server based on the read-only serial number;
    wherein said tag reading device is further configured to:
        compare the unique tag IDs of the read-only information and modifiable information, and
        commence the communication of said first unique tag-ID to said server using said service information based on a matching result of the comparison.

5. A method of receiving a service based on radio-frequency identification (RFID) tag information, the method comprising:
    reading an RFID tag with an RFID reader to obtain tag information, wherein said tag information includes read-only information and modifiable information;
    extracting service information and a digital signature from said tag's modifiable information and a read-only tag identification (ID) from said tag's read-only information via the RFID reader, said service information comprising communication link information for contacting a server, and said read-only tag identification comprising a serial number embedded in a header of the RFID tag;
    determining whether said read-only tag ID matches a unique tag ID in said digital signature via the RFID reader;

if said read-only tag ID matches said unique tag ID in said digital signature, assembling said service information and said unique tag ID to form a message and forwarding said message to said server via the RFID reader; and receiving at the RFID reader said service based on said serial number of said RFID tag from the server; and reading out service information from said tag and receiving said service at least partially based on said service information.

6. A method of receiving a service from a server at a reader device, the service being based on the readout information of a readout operation by said reader device of a tag, said tag comprising read-only information and modifiable information, said read-only information comprising a unique tag-ID of said tag, and said modifiable information comprising a digital signature of the tag and service information, said service information comprising communication link information for contacting the server, said method comprising:

reading out said digital signature and service information from modifiable information of the tag and said unique tag-ID from read-only information of the tag during said readout operation via said reader device, wherein the unique tag-ID comprises a read-only serial number embedded in a header of the tag;

determining whether said unique tag-ID matches a tag-ID stored in the digital signature via said reader device;

if said unique tag-ID matches the tag-ID stored in said digital signature, communicating said unique tag-ID to said server via said reader device using said service information; and receiving said service at said reader device from the server as a response to said communicating, said service being determined based on the read-only serial number.

7. The tag reading device of claim 4, further adapted to retrieve a digital signature and to determine whether said unique tag-ID matches a tag-ID stored in said digital signature.

8. The method according to claim 1, wherein the service information comprises a Uniform Resource Identifier (URI).

9. The method according to claim 1, wherein the service information comprises an IP address.

10. The tag reading device of claim 4, wherein the service information comprises a Uniform Resource Identifier (URI).

11. The tag reading device of claim 4, wherein the service information comprises an IP address.

12. The method of claim 5, wherein the service information comprises a Uniform Resource Identifier (URI).

13. The method of claim 5, wherein the service information comprises an IP address.

14. The method of claim 6, wherein the service information comprises a Uniform Resource Identifier (URI).

15. The method of claim 6, wherein the service information comprises an IP address.

* * * * *